(12) United States Patent
Corley

(10) Patent No.: US 6,811,021 B1
(45) Date of Patent: Nov. 2, 2004

(54) PLASTIC CONVEYOR BELT MODULES WITH UNITARY SIDEGUARDS

(75) Inventor: Andrew A. Corley, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/605,936

(22) Filed: Nov. 6, 2003

(51) Int. Cl.[7] .............................................. B65G 13/02
(52) U.S. Cl. ................ 198/690.2; 198/822; 198/699.1; 198/853; 198/818
(58) Field of Search ............................. 198/690.2, 778, 198/822, 699.1, 853, 818

(56) References Cited

U.S. PATENT DOCUMENTS

| | | | | |
|---|---|---|---|---|
| 2,264,810 A | * | 12/1941 | Robbins | 198/714 |
| 4,603,776 A | * | 8/1986 | Olsson | 198/728 |
| 4,821,872 A | * | 4/1989 | Lapeyre | 198/853 |
| 4,832,183 A | * | 5/1989 | Lapeyre | 198/699 |
| 4,840,269 A | * | 6/1989 | Anderson | 198/822 |
| 4,972,942 A | * | 11/1990 | Faulkner | 198/853 |
| 5,165,514 A | * | 11/1992 | Faulkner | 198/347.3 |
| 5,346,057 A | * | 9/1994 | Fisher et al. | 198/778 |
| 5,413,211 A | | 5/1995 | Faulkner | 198/690.2 |
| 5,469,956 A | * | 11/1995 | Greve et al. | 198/699.1 |
| 6,029,797 A | | 2/2000 | Olsson | 198/778 |
| 6,237,750 B1 | | 5/2001 | Damkjaer et al. | 198/778 |
| 6,382,404 B1 | * | 5/2002 | Guldenfels | 198/850 |
| 2003/0000810 A1 | | 1/2003 | Hansen et al. | 198/822 |
| 2003/0015406 A1 | | 1/2003 | Guldenfels et al. | 198/837 |

OTHER PUBLICATIONS

P.B.A Industril Supplies LTD Series 25 Accessories, year 2000, website www.pbaindustril.com.*
Packworld.com Conveyor accessories, Aug. 1996, website www.packworld.com/articles/Products/3408.html.*

* cited by examiner

*Primary Examiner*—Richard Ridley
(74) *Attorney, Agent, or Firm*—James T. Cronvich

(57) ABSTRACT

A plastic conveyor belt module with a unitary sideguard. The sideguard extends upward perpendicularly from the top conveying surface of a plastic module body. The sideguard extends longitudinally along the conveying surface with a leading edge laterally offset from a trailing edge. Wedge-shaped indentations formed at the leading and trailing edges allow the sideguards of leading and trailing belt modules in a conveyor belt to mesh and to overlap without interference as the belt backflexes.

36 Claims, 4 Drawing Sheets

US 6,811,021 B1

PLASTIC CONVEYOR BELT MODULES WITH UNITARY SIDEGUARDS

BACKGROUND OF INVENTION

The invention relates generally to power-driven conveyors and, more particularly, to modular plastic conveyor belts with sideguards unitarily formed with plastic belt modules.

Sideguards are commonly used with belt conveyors to prevent conveyed materials such as aggregates, vegetables, and fruits from falling off the sides of the belt. Typically, a sideguard is positioned near both sides of each belt row. The leading edge of a sideguard is usually laterally offset from the trailing edge. In this way, the leading edge of a sideguard of a trailing row does not interfere with the trailing edge of a sideguard of a leading row. In modular plastic belts, the sideguards are typically angularly disposed from one edge to the other so that the sideguards of consecutive rows form a continuous wall of sideguards overlapping fan-like. When a belt with sideguards bends backwards, such as when entering an incline, the overlap of consecutive sideguards and, consequently, the force exerted by the overlapping sideguards on each other, increase. To endure the increased force during backflexing without damage, sideguards are usually designed to be thin and therefore resilient. But thin sideguards are easier to break with equipment, such as hoses for cleaning, that may come into contact with the sideguards during belt operation or maintenance.

In modular plastic conveyor belts, sideguards are usually supplied as attachments to belts. The sideguards snap into belt structure or are connected to the hinge rods joining consecutive rows of belt modules together. But these connections are often fairly loose. Although excess play in the connections provides some relief to the backflexing problem, loose connections prevent consecutive sideguards from meshing well and therefore leave gaps through which conveyed articles can escape. Furthermore, these connection schemes are generally insufficiently sturdy to accommodate other than thin, lightweight sideguards.

Thus, there is a need for a plastic conveyor belt module with durable sideguards that can handle backflexing of a conveyor belt.

SUMMARY OF INVENTION

These needs and others are satisfied by a plastic conveyor belt module embodying features of the invention. The module includes a plastic module body that extends longitudinally from a first end to a second end and transversely from a first side to a second side. The module body further includes a top surface extending longitudinally from the first end to the second end and transversely from the first side to the second side. A sideguard upstanding from the top surface forms a wall that extends generally longitudinally from a first edge at a first end of the module body to a second edge at a second end. The first edge and the second edge of the sideguard are generally perpendicular to the top surface. The sideguard is also unitarily molded with the plastic module body. These modules and other modules devoid of sideguards can be arranged together to construct a modular conveyor belt with the sideguards forming a continuous wall along the length of the belt.

In a second aspect of the invention, a conveyor belt module comprises a plastic module body extending longitudinally from a first end to a second end, transversely from a first side to a second side, and vertically from a top surface to a bottom surface. First and second sets of hinge eyes are arranged along the first and second ends of the module body. A wall unitarily molded with the plastic module body extends vertically upward from the top surface. The wall has a base connected to the top surface along a longitudinal junction. A leading edge of the wall extends upward from one of the hinge eyes of the first set at the first end of the module body. A trailing edge of the wall upward from one of the hinge eyes of the second set at the second end. The leading and trailing edges are transversely offset.

In another aspect of the invention, a conveyor belt module comprises a plastic module body that has a top deck and extends longitudinally from a first end to a second end and laterally from a first side to a second side. First and second sets of hinge eyes are arranged along the first and second ends of the module body. A wall upstanding from the deck is formed unitarily with the plastic module body. The wall extends longitudinally along the deck from a first edge of the wall at the first end of the module body to a second edge of the wall at the second end. The wall extends laterally between first and second lateral sides. The first and second edges of the wall are generally perpendicular to the deck. A first wedge-shaped indentation is formed in the first lateral side of the wall at the first edge. A second wedge-shaped indentation is formed in the second lateral side of the wall at the second edge. In this way, the first and second edges are laterally offset.

In yet another aspect of the invention, a conveyor belt module comprises a plastic module body that extends longitudinally from a first end to a second end and laterally from a first side to a second side. The module body also has a top deck. First and second sets of hinge eyes are arranged along the first and second ends of the module body. A sideguard upstanding from the deck is formed unitarily with the plastic module body. The sideguard includes first and second laterally offset plates. Each plate is generally in the form of a right trapezoid, which has a long base, a short base, a slanted edge, and a perpendicular edge generally perpendicular to the deck. The first plate and the second plate are attached along their long bases to the deck. The first plate extends longitudinally from the first end to the second end of the module body with its perpendicular edge at the first end. The second plate extends longitudinally from the first end to the second end with its perpendicular edge at the second end. The two plates are joined to each other along imaginary portions of confronting lateral faces.

In still another aspect of the invention, a conveyor belt module comprises a plastic module body that has a top deck and extends longitudinally from a first end to a second end and laterally from a first side to a second side. First and second sets of hinge eyes are arranged along the first and second ends of the module body. A sideguard upstanding from the deck is formed unitarily with the plastic module body. The sideguard includes a trapezoidal prism that terminates laterally in first and second opposite parallel faces. The distance between the faces defines a central thickness of the sideguard. The trapezoidal prism is further characterized by a base extending longitudinally along deck from the first end to the second end of the module body. First and second edges of the sideguard extend upward from the ends of the base and converge toward each other. The sideguard further includes first and second extensions. The first extension is flush with the first face of the trapezoidal prism, and the second extension is flush with the second face. The first extension extends longitudinally from the first edge of the triangular prism toward the first end of the module body. The second extension extends longitudinally from the second edge toward the second end of the module body. The thickness of the first and second extensions are less than the central thickness of the sideguard.

According to another aspect of the invention, a plastic conveyor belt module comprises a plastic module body with a top deck. The module extends longitudinally from a first end to a second and laterally from a first side to a second side. First and second sets of hinge eyes are arranged along the first and second ends of the module body. A sideguard upstanding from the deck is unitarily formed with the plastic module body. The sideguard includes first, second, and connecting portions. The first portion extends longitudinally along the deck from the first end of the module body. The second portion extends longitudinally along the deck from the second end of the module body. The second portion is offset laterally from the first portion. The connecting portion is disposed between the first and second ends of the module body and extends laterally from the first portion to the second portion. The longitudinal extent of the connecting portion decreases with distance above the deck.

BRIEF DESCRIPTION OF DRAWINGS

These and other features, aspects, and advantages of the invention are better understood by reference to the following description, appended claims, and accompanying drawings, in which:

DETAILED DESCRIPTION

Figure 1C:
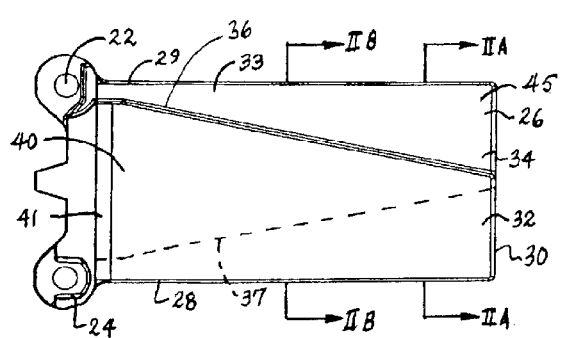
FIGS. 1A–1C are top plan, front elevation, and side elevation views of a plastic conveyor belt module with a unitary sideguard embodying features of the invention.

A conveyor belt module embodying features of the invention is shown in FIG. 1. The module 10 includes a module body 12 having a top surface or conveying deck 14 and an opposite bottom surface 15. The module extends longitudinally from a first end 16 to a second end 17. The module extends transversely in a lateral direction from a first side 18 to a second side 19. First and second sets of hinge eyes 20, 21 are spaced apart along the first and second ends of the module body. Holes 22 through the hinge eyes admit a hinge rod for interconnecting modules together into a conveyor belt. Retention structure 24 in the outermost hinge eye of the module can be used to capture the head of a hinge pin and retain it in place.

Upstanding structure in the form of a sideguard 26 forming a vertical wall extends upward from the deck at a lateral position spaced inward of the outside of the module. The sideguard is unitarily formed with the module body preferably in an injection molding process. The module is preferably molded out of a thermoplastic material, such as polypropylene, polyethylene, acetal, or a composite resin that may include fibers or other additives.

Figure 1A:
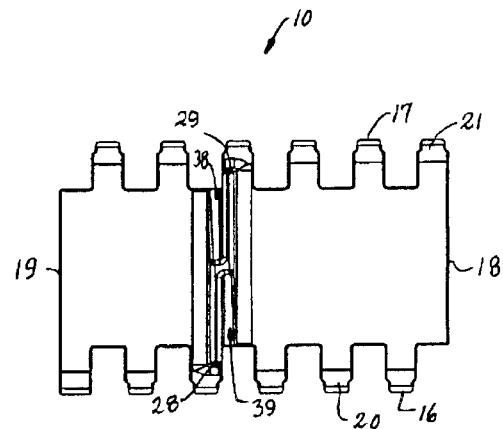
Figure 2A:
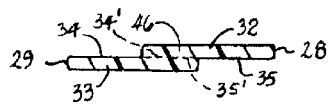
FIGS. 2A and 2B are cross section views of the sideguard of FIG. 1 viewed along lines IIA—IIA and IIB—IIB of FIG. 1C.
Figure 2B:
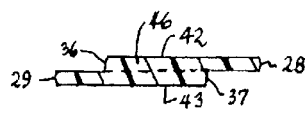
Figure 1B:
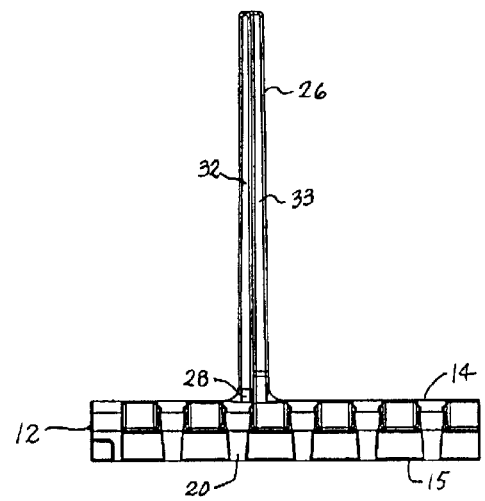

Leading and trailing edges 28, 29 of the sideguard preferably extend perpendicularly upward from the deck at one of the hinge eyes 20, 21. Thus, viewed from the side of the module, the sideguard has a rectangular profile with a flat top 30. (To make the module easier to remove from the mold during manufacturing, the leading and trailing edges are preferably angled slightly off perpendicular from the deck.) As can be seen in FIGS. 1A and 1B, as well as FIGS. 2A and 2B, the leading and trailing edges are laterally offset. By extending out onto the hinge eyes at least as far as the centerline of the rod holes 22, the sideguard can form a wall with the sideguards of leading and trailing rows of modules in a conveyor belt. The lateral offset allows the sideguards of consecutive rows to mesh without interference.

The sideguard can be considered as a pair of laterally offset trapezoidal plates 32, 33 joined along imaginary portions 34', 35' of confronting lateral faces 34, 35. The long base 41 of each trapezoid extends longitudinally along the deck. The generally vertical leading and trailing edges 28, 29 of the sideguard form straight edges of the trapezoidal plates. The opposite sides 36, 37 of each plate are angled obliquely from the plane of the deck. Thus, the sideguard forms wedge- or V-shaped indentations 38, 39 along the leading and trailing edges on opposite sides of the sideguard. The junction 40 between the two plates is in the shape of a trapezoidal prism with a longitudinal base 41 and a pair of angled edges 36, 37 converging toward each other with distance above the deck. Parallel lateral faces of the junction 42, 43 define a central thickness of the sideguard. Flush extensions 44, 45 of the two faces terminate in the leading and trailing edges 28, 29. The lateral thickness of the extensions is less than the central thickness of the sideguard by an amount corresponding to the lateral depth of the wedge-shaped indentations. The junction between the two plates can be considered a connecting portion between two plate portions of the sideguard. As shown in FIG. 2, the longitudinal extent of the connecting portion 46 decreases with distance above the deck.

Figure 3:
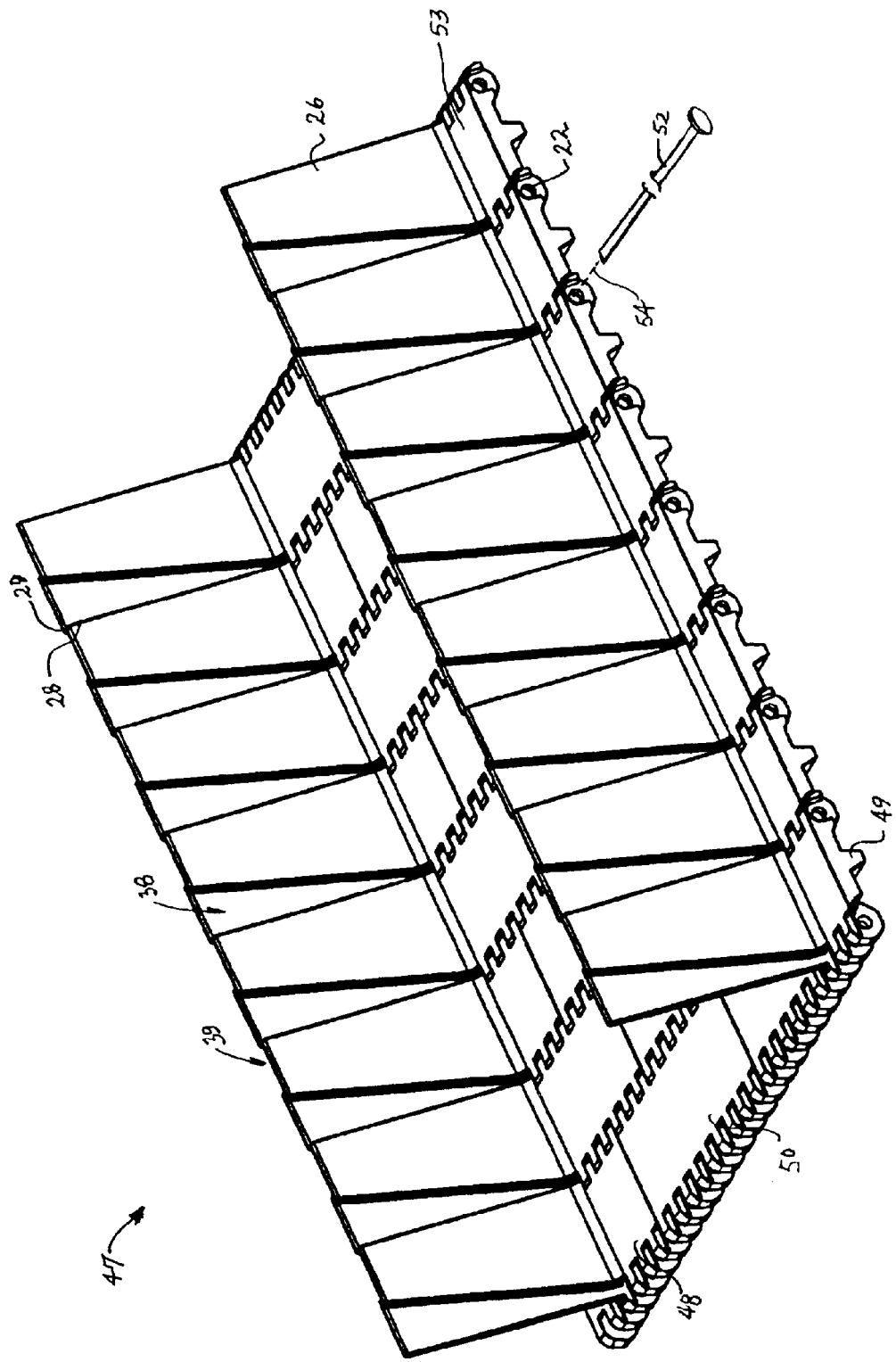
FIG. 3 is an isometric view of a portion of a modular plastic conveyor belt constructed of the belt modules of FIG. 1 on a flat conveying path.
Figure 4:
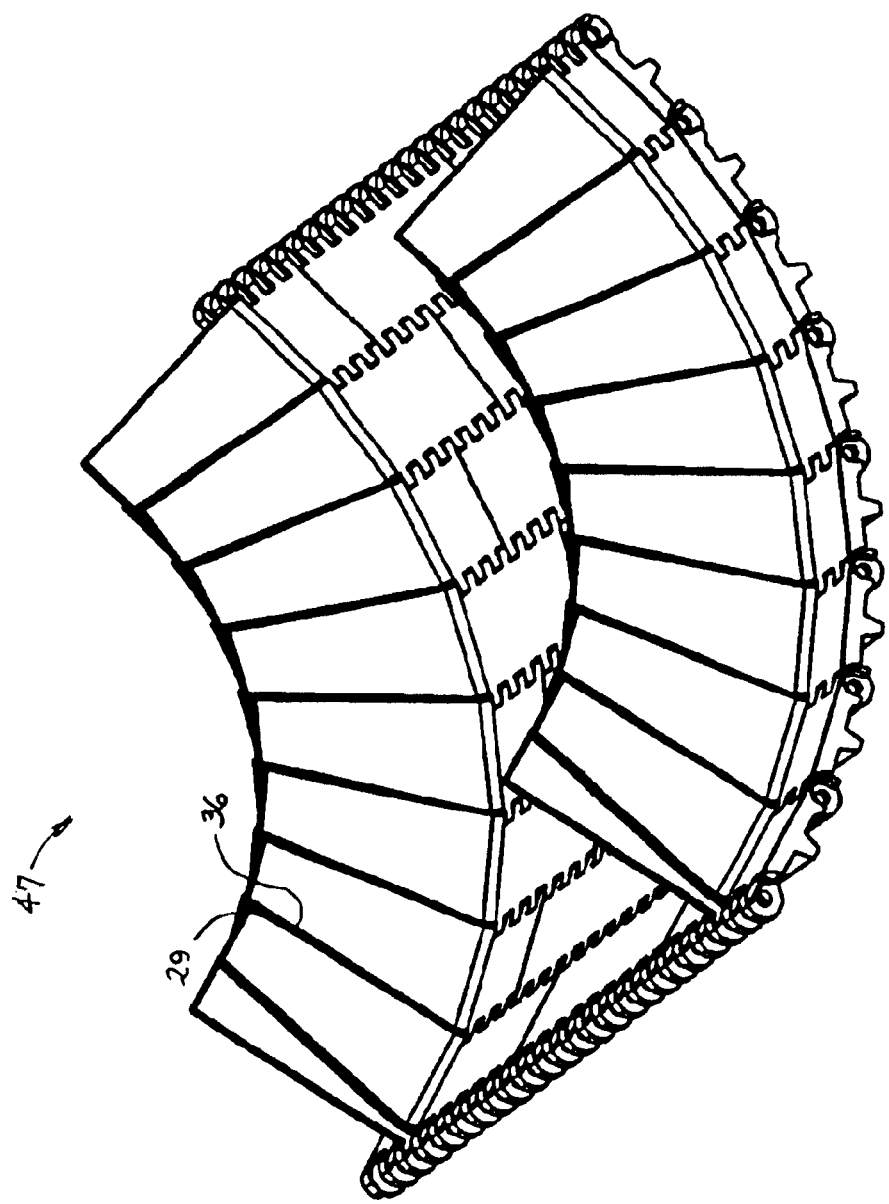
FIG. 4 is an isometric view of the conveyor belt of FIG. 3 on a backflexing conveying path.

FIG. 3 shows a portion of a conveyor belt constructed of sideguard modules as in FIG. 1. The belt 47 includes short edge modules 48 (like the module in FIG. 1), long edge modules 49, and interior modules 50 without sideguards. The short edge modules differ from the long edge modules only in that the long edge modules have more hinge eyes and are wider than the short edge modules. Any number of interior modules can be added to construct a belt of any desired width in a bricklay pattern. Each row of modules is connected to leading and trailing rows by a hinge rod 52 inserted in a passageway formed by the aligned holes 22 of interleaved hinge eyes of adjacent rows. The sideguards are indented inward of the outside edge of the belt, leaving an indent 53 along the sides. The indent provides the edges of the belt with flat bearing surfaces that can ride on support shoes in the conveyor returnway. When the belt is operated on a level conveying path, the sideguards of consecutive rows overlap slightly because the leading and trailing edges 28, 29 rise generally perpendicularly from the deck at positions at or just beyond the center lines 54 of the rod holes. The lateral offset of the leading and trailing edges allows consecutive side guards to overlap without interfering with each other. The wedge-shaped indentations 38, 39 provide room for the sideguards to collapse if the belt has to backflex as shown in FIG. 4. When the belt backflexes, the trailing edge 29 of a leading module moves along the wedge-shaped indentation until it comes in contact with the leading angled, or slanted, edge 36 of the trailing sideguard on the interior side of the belt. A similar meeting of the corresponding edges of the sideguard occurs on the exterior side of the belt. The angle of the angled edge determines the amount of backflexing that can be accommodated. In this way, the belt can backflex without lateral forces being exerted between consecutive flights. This allows the flights to be made thick and, therefore, durable.

Figure 5:
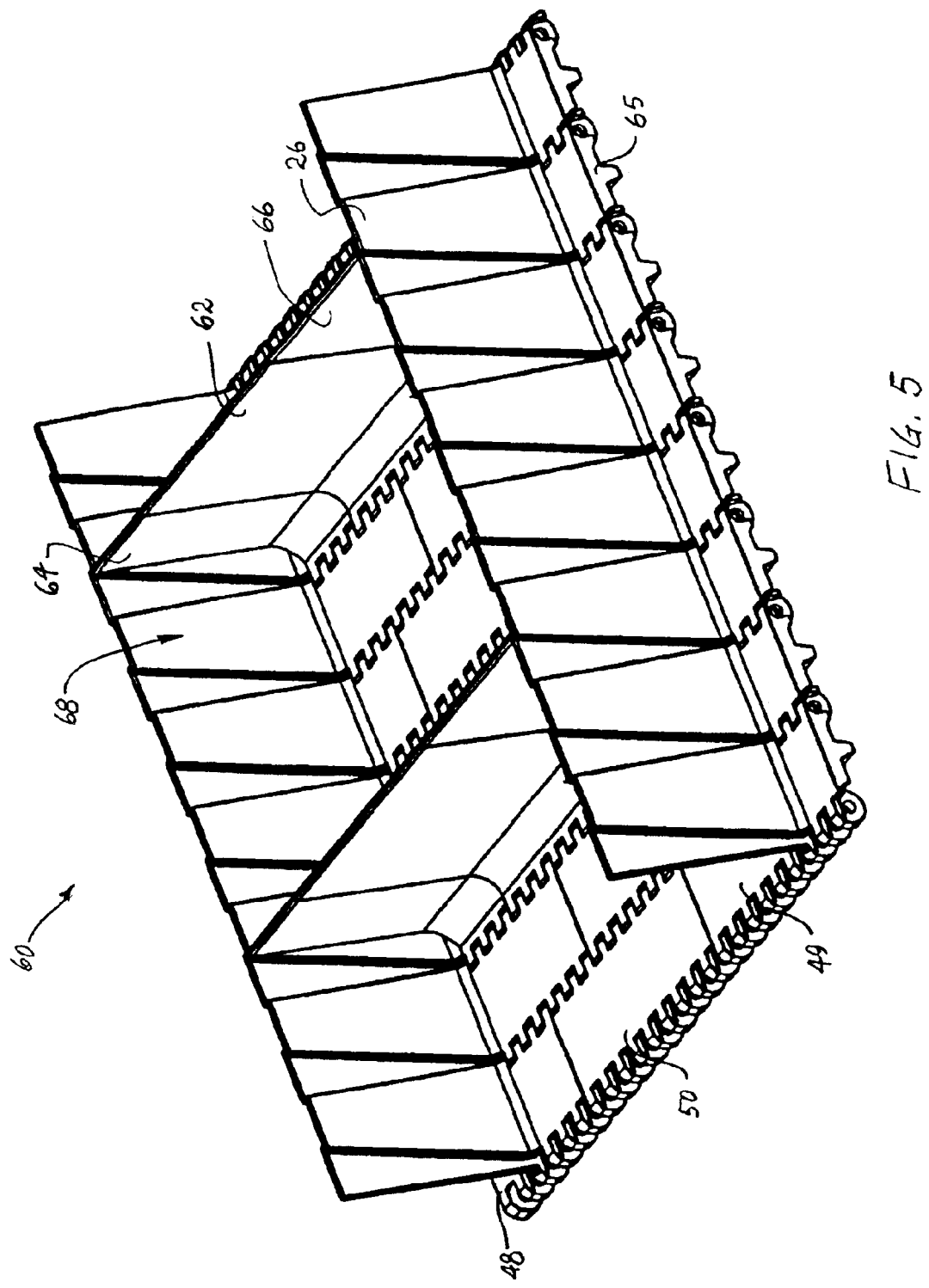
FIG. 5 is an isometric view of a conveyor belt as in FIG. 3, but including belt modules with unitary flights as well as sideguards.

Another version of a belt module with unitary sideguards is illustrated in the belt segment of FIG. 5. Like the belt segment of FIG. 3, the belt segment 60 of FIG. 5 includes short edge modules 48, long edge modules 49, and flattop interior modules 50. But the belt also includes flighted interior modules 62 and short and long flighted edge modules 64, 65. The short and long flighted edge modules have a flight 66 unitarily molded with the module body. The flight extends upward from the deck of the module and is preferably perpendicularly attached to the interior wall of the sideguard 26. A belt constructed of these modules, as shown in FIG. 5, divides the conveyor into a series of individual moving compartments 68 bounded on four sides by the walls formed by the flights and sideguards.

Although the invention has been described in detail with reference to a couple of preferred versions, other versions are possible. For example, the top of the sideguards does not have to be flat. As another example, the sideguard could be positioned closer to the edge of the belt than the indented sideguards shown in detail. As yet another example, the sideguards of consecutive modules do not have to overlap or extend onto the hinge eyes. In some applications, a gap between sidewalls may be acceptable. So, as these few examples suggest, the scope of the invention as defined in the claims is not meant to be limited to the versions described in detail.

What is claimed is:

1. A plastic conveyor belt module comprising:
   a plastic module body extending longitudinally from a first end to a second end and transversely from a first side to a second side and including a top surface extending longitudinally from the first end to the second end and transversely from the first side to the second side;
   a sideguard upstanding from the top surface and forming a wall that extends generally longitudinally from a first edge at the first end of the module body to a second edge at the second end;
   wherein the first edge and the second edge are generally perpendicular to the top surface; and
   wherein the sideguard is unitarily molded with the plastic module body.

2. A plastic conveyor belt module as in claim 1 wherein the sideguard is generally rectangular in shape when viewed from the first side of the module body.

3. A plastic conveyor belt module as in claim 1 wherein the sideguard includes first and second thinned-out regions at the respective first and second ends of the module body.

4. A plastic conveyor belt module as in claim 3 wherein the first and second thinned-out regions define wedge-shaped recesses at the first and second ends of the module body.

5. A plastic conveyor belt module as in claim 1 wherein the sideguard is thinner at the first and second ends of the module body than at a point midway between the first and second ends.

6. A plastic conveyor belt module as in claim 1 wherein the sideguard is indented inward transversely from the first side of the module body.

7. A plastic conveyor belt module as in claim 1 wherein the sideguard includes a first flat portion and a second flat portion in a partly overlapping relationship.

8. A plastic conveyor belt module as in claim 1 further comprising a flight unitarily formed with the module body and the sideguard and extending upward from the top surface of the module body and perpendicularly from the sideguard toward the second side of the module body.

9. A plastic conveyor belt module as in claim 1 wherein the first edge and the second edge of the sideguard are transversely offset from each other.

10. A modular plastic conveyor belt formed of a plurality of plastic conveyor belt modules as in claim 1 linked end to end and side to side in rows with other belt modules devoid of sideguards to form a modular plastic conveyor belt, characterized in that the plastic conveyor belt modules with sideguards are arranged as the outermost belt modules of each row.

11. A plastic conveyor belt module comprising:
    a plastic module body extending longitudinally from a first end to a second end, transversely from a first side to a second side, and vertically from a top surface to a bottom surface;
    first and second sets of hinge eyes arranged along the first and second ends of the plastic module body;
    a wall including a base connected to the top surface along a longitudinal junction, the wall extending vertically upward from the top surface and being unitarily molded with the plastic module body,
    wherein the wall includes a leading edge extending upward from one of the hinge eyes of the first set at the first end of the module body and a trailing edge extending upward from one of the hinge eyes of the second set at the second end of the module body; and
    wherein the leading edge and the trailing edge of the wall are transversely offset.

12. A plastic conveyor belt module as in claim 11 wherein the leading edge and the trailing edge extend perpendicularly upward from the top surface of the module body.

13. A plastic conveyor belt module as in claim 11 wherein the wall includes first and second thinned-out regions at the respective first and second ends of the module body.

14. A plastic conveyor belt module as is claim 13 wherein the first and second thinned-out regions define V-shaped recesses in the wall at the first and second ends of the module body wherein one side of the V at the first end is defined by the leading edge of the wall and one side of the V at the second end is defined by the trailing edge of the wall.

15. A modular plastic conveyor belt module having an outer side edge formed by a series of plastic conveyor belt modules as in claim 11 linked end to end by hinge pins received in the interleaved hinge eyes of adjacent belt modules wherein the trailing edge of the wall of a leading module is transversely offset from the leading edge of the wall of a trailing module so that the plates do not interfere with each other when the conveyor belt modules are arranged consecutively in the modular plastic conveyor belt.

16. A modular plastic conveyor belt as in claim 15 wherein the trailing edge of the wall of a leading module overlaps the leading edge of the wall of a trailing module to form a gapless wall along the conveyor belt.

17. A plastic conveyor belt module comprising:
    a plastic module body having a top deck and extending longitudinally from a first end to a second end and laterally from a first side to a second side;
    first and second sets of hinge eyes arranged along the first and second ends of the plastic module body;
    a wall upstanding from the deck and unitarily formed with the plastic module body,
    the wall extending longitudinally along the deck from a first edge of the wall at the first end of the plastic module body to a second edge at the second end and laterally between first and second lateral sides of the wall, wherein the first and second edges are generally perpendicular to the deck, and wherein the first lateral side of the wall forms a first wedge-shaped indentation at the first edge and the second lateral side of the wall forms a second wedge-shaped indentation at the second edge, whereby the first and second edges are laterally offset.

18. A plastic conveyor belt module as in claim 17 further comprising a flight unitarily formed with the module body and the wall and extending upward from the deck and perpendicularly from the wall.

19. A plastic conveyor belt module as in claim 17 wherein the first edge of the wall extends onto a hinge eye of the first set and wherein the second edge of the wall extends onto a hinge eye of the second set.

20. A plastic conveyor belt module as in claim 17 wherein the wedge-shaped indentations widen with distance from the deck.

21. A plastic conveyor belt module as in claim 17 wherein the wall includes a flat top.

22. A modular plastic conveyor belt formed of a plurality of plastic conveyor belt modules as in claim 17 linked end to end and side to side in rows with other belt modules devoid of walls to form a modular plastic conveyor belt, characterized in that the plastic conveyor belt modules with walls are arranged consecutively along the length of the conveyor belt with the walls laterally aligned to form a continuous longitudinal wall along the length of the conveyor belt.

23. A plastic conveyor belt module comprising:

a plastic module body having a top deck and extending longitudinally from a first end to a second end and laterally from a first side to a second side;

first and second sets of hinge eyes arranged along the first and second ends of the plastic module body;

a sideguard upstanding from the deck and unitarily formed with the plastic module body, the sideguard including first and second laterally offset plates, each generally in the form of a right trapezoid having a long base, a short base, a slanted edge, and a perpendicular edge generally perpendicular to the deck;

the first plate being attached along its long base to the deck and extending longitudinally from the first end to the second end of the module body with its perpendicular edge at the first end;

the second plate being attached along its long base to the deck and extending longitudinally from the first end to the second end of the module body with its perpendicular edge at the second end;

wherein the first and second plates are joined to each other along imaginary portions of confronting lateral faces.

24. A plastic conveyor belt module as in claim 23 further comprising a flight unitarily formed with the module body and the sideguard and extending upward from the deck and perpendicularly from the sideguard.

25. A plastic conveyor belt module as in claim 23 wherein the perpendicular edge of the first plate extends onto a hinge eye of the first set and wherein the perpendicular edge of the second plate extends onto a hinge eye of the second set.

26. A plastic conveyor belt module as in claim 23 wherein the sideguard includes a flat top.

27. A modular plastic conveyor belt formed of a plurality of plastic conveyor belt modules as in claim 23 linked end to end and side to side in rows with other belt modules devoid of sideguards to form a modular plastic conveyor belt characterized in that the plastic conveyor belt modules with sideguards are arranged consecutively along the length of the conveyor belt with the sideguards laterally aligned to form a continuous longitudinal wall along the length of the conveyor belt.

28. A plastic conveyor belt module comprising:

a plastic module body having a top deck and extending longitudinally from a first end to a second end and laterally from a first side to a second side;

first and second sets of hinge eyes arranged along the first and second ends of the plastic module body;

a sideguard upstanding from the deck and unitarily formed with the plastic module body, the sideguard including a trapezoidal prism terminating laterally in first and second opposite parallel faces defining therebetween a central thickness of the sideguard, the trapezoidal prism further characterized by a base extending longitudinally along the deck from the first end to the second end of the module body and by first and second edges extending upward from the ends of the base and converging toward each other;

the sideguard further including first and second extensions, wherein the first extension is flush with the first face and extends longitudinally from the first edge of the triangular prism toward the first end of the module body, and wherein the second extension is flush with the second face and extends longitudinally from the second edge of the triangular prism toward the second end of the module body, and wherein the thicknesses of the first and second extensions are less than the central thickness of the sideguard.

29. A plastic conveyor belt module as in claim 28 further comprising a flight unitarily formed with the module body and the sideguard and extending upward from the deck and perpendicularly from the sideguard.

30. A plastic conveyor belt module as in claim 28 wherein the first extension of the sideguard extends onto a hinge eye of the first set and wherein the second extension of the sideguard extends onto a hinge eye of the second set.

31. A modular plastic conveyor belt formed of a plurality of plastic conveyor belt modules as in claim 28 linked end to end and side to side in rows with other belt modules devoid of sideguards to form a modular plastic conveyor belt, characterized in that the plastic conveyor belt modules with sideguards are arranged consecutively along the length of the conveyor belt with the sideguards laterally aligned to form a continuous longitudinal wall along the length of the conveyor belt.

32. A plastic conveyor belt module comprising:

a plastic module body having a top deck and extending longitudinally from a first end to a second end and laterally from a first side to a second side;

first and second sets of hinge eyes arranged along the first and second ends of the plastic module body;

a sideguard upstanding from the deck and unitarily formed with the plastic module body, the sideguard including:

a first portion extending longitudinally along the deck from the first end of the module body, a second portion offset laterally from the first portion and extending longitudinally along the deck from the second end of the module body, and a connecting portion disposed between the first and second ends of the module body and extending laterally from the first portion to the second portion, wherein the longitudinal extent of the connecting portion decreases with distance above the deck.

33. A plastic conveyor belt module as in claim 32 further comprising a flight unitarily formed with the module body and the sideguard and extending upward from the deck and perpendicularly from the sideguard.

34. A plastic conveyor belt module as in claim 32 wherein the first portion of the sideguard extends onto a hinge eye of the first set and wherein the second portion of the sideguard extends onto a hinge eye of the second set.

35. A plastic conveyor belt module as in claim 32 wherein the wall includes a flat top.

36. A modular plastic conveyor belt formed of a plurality of plastic conveyor belt modules as in claim 32 linked end to end and side to side in rows with other belt modules devoid of sideguards to form a modular plastic conveyor belt, characterized in that the plastic conveyor belt modules with sideguards are arranged consecutively along the length of the conveyor belt with the sideguards laterally aligned to form a continuous longitudinal wall along the length of the conveyor belt.

* * * * *